Jan. 31, 1967   E. A. EDLING ETAL   3,302,024
MOTOR USING NUCLEAR CHARGED PARTICLES
Filed Sept. 22, 1961   2 Sheets-Sheet 1
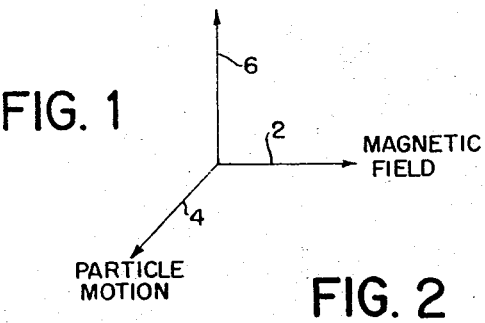
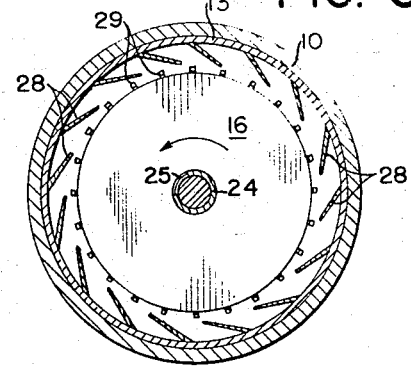
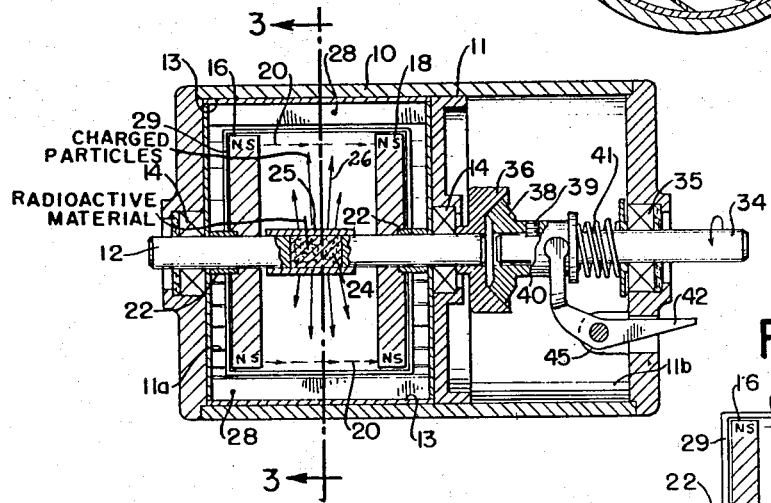
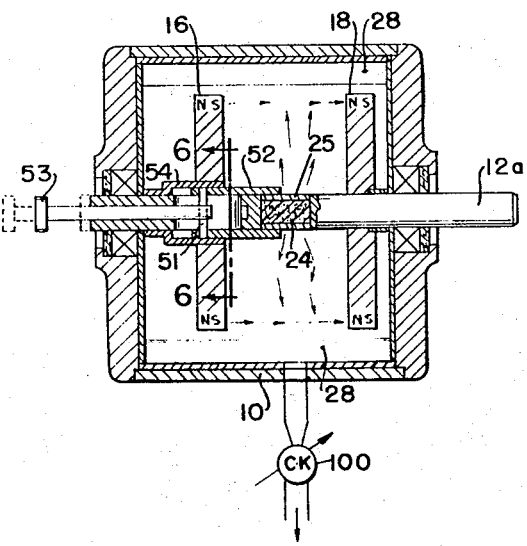
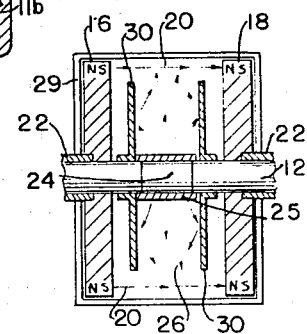
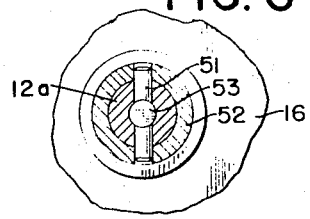
INVENTORS
ELLSWORTH A. EDLING
RICHARD P. McKENNA
BY
Darby & Darby
ATTORNEYS

United States Patent Office 3,302,024
Patented Jan. 31, 1967

3,302,024
MOTOR USING NUCLEAR CHARGED PARTICLES
Ellsworth A. Edling, 3176 W. 90th St., Cleveland, Ohio
44104, and Richard P. McKenna, Box 57, Navesink,
N.J. 07752
Filed Sept. 22, 1961, Ser. No. 140,087
16 Claims. (Cl. 250—106)

This invention relates to motors and more particularly to a motor which is driven by the interaction of nuclear charged particles with a magnetic field.

The techniques currently available for directly utilizing the energy of the atom to produce electricity are rather cumbersome and inefficient. In one technique now utilized, the heat of atomic fission is used to heat a secondary fluid such as water or liquid sodium in a nuclear reactor. In this process, there is a subsequent production of steam, or expansion of the fluid, which is used to operate a conventional heat engine through a heat exchange process. The heat engine then drives a generator to produce the desired electricity.

The aforesaid process is cumbersome and inefficient due to the several steps needed to finally produce the electricity and also because of the Carnot-cycle limitations inherent in this system. As another disadvantage, the nuclear reactor also produces large amounts of radioactive waste materials the disposal of which is in itself a problem because of the hazard of radioactive contamination. Furthermore a nuclear reactor employs an atomic chain-reaction that is potentially unstable and is therefore characteristically hazardous.

As is clear from the above, it would be highly desirable to be able to use the energy of atomic radiation to produce electricity directly, and even more desirable to produce motor action directly from atomic radiation without the necessity of first producing electricity. The present invention is directed to the latter objective and more particularly to a motor which is operated directly by a source of atomic (radioactive) energy. By providing a motor which is operated directly from a source of radioactive energy, and in a manner that avoids the necessity for an atomic chain reaction, there is no necessity for an external source of electric power and therefore, the motor is completely self-contained and capable of operating independently at any location, with inherent safety from the danger of a thermonuclear explosion that may characterize a nuclear reactor. This therefore provides a prime mover (motor) which can be operated in places where no electric power is produced where maintenance and control facilities are negligible, and the motor itself can be used to drive a conventional electric generator to produce electricity. Further, such a motor provides an ideal use for radioactive waste materials.

As is well-known radioactive nuclei emit radiation of three kinds—alpha, beta and gamma. The present invention is concerned only with the first two. Alpha radiation consists of positively-charged particles which are in fact, the nuclei of helium atoms. Beta radiation, also of a particle nature, is composed of hi-speed electrons, which of course bear a negative charge.

In accordance with the invention, the motor uses the interaction of these high velocity nuclear charged particles with a magnetic field to produce motor action. The motor has a radioactive source which emits charged particles and a rotor is provided for establishing a magnetic field. When the charged particles pass through the magnetic field, a force is exerted upon the moving particles in accordance with the well-known "left-hand rule," which illustrates the interaction of moving charged particles in a magnetic field. Because of the interaction, an equal and opposite force is produced which sets on the rotor to produce a torque on the rotor shaft. It will be appreciated that other equivalent sources of high velocity particles may be substituted for the radioactive material.

It is therefore an object of this invention to provide a motor which operates with nuclear charged particles as the power source.

A further object of the invention is to provide a motor having a permanent magnet rotor and a source of nuclear charged particles which interact with the magnetic field produced by the rotor to produce motor action.

Yet another object of this invention is to provide a motor operated by nuclear charged particles, which is not dependent upon any external power source.

Other objects and advantages of the present invention will become more apparent upon reference to the following specification and the annexed drawings in which:

FIGURE 1 is a diagram illustrating the basic "left-hand" motor rule;

FIGURE 2 is a cross-section of one form of motor built according to the principles of the present invention;

FIGURE 3 is a cross-section of the motor of FIGURE 2 taken along lines 3—3 of FIGURE 2;

FIGURE 4 shows a modification of the motor used to achieve greater efficiency;

FIGURE 5 is a cross-sectional view of another embodiment of a motor in accordance with the invention;

FIGURE 6 is a cross-section of the shaft and movable shield arrangement of the motor of FIGURE 5, taken along lines 6—6 of FIGURE 5;

Figure 7:
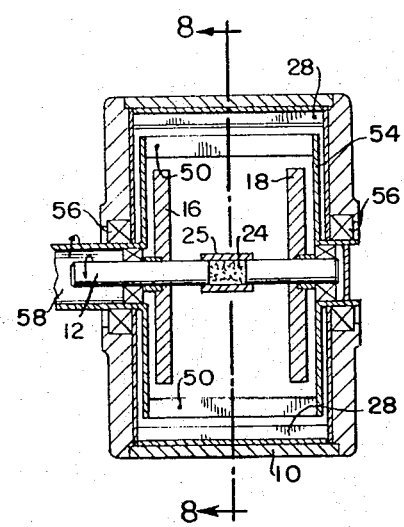
FIGURE 7 shows a cross-section of another embodiment of the invention in which counter-rotating rotors and shafts are utilized.

It is well known that conventional electric motors are governed by the use of Fleming's Motor Rule, generally called the "left-hand rule," which illustrates the effects produced by the interaction of moving charged particles in a transverse magnetic field. This underlying rule is shown for a typical case of a positively charged particle in a magnetic field in FIGURE 1, where line 2 represents the direction of the magnetic field, line 4 represents the direction of motion of the positively charged particle, and line 6 represents the direction of the force produced on the particle due to the interaction. It can be seen that when the charged particle is moved transversely to the magnetic field a force is produced on the particle in a direction which is perpendicular to both the direction of motion and the direction of field. This basic theory underlies all electric motors in which case the charged particles are electrons moving through a conductor. In the present case, the charged particles, which are either alpha or beta particles emitted by a radioactive atomic nucleus, move in air or vacuum across the magnetic field.

In order to understand how nuclear charged particles may be used to produce motor action, reference is made to FIGURE 2 which shows one embodiment of the invention. In FIGURE 2, the motor has an outer housing 10 which is of a suitable material and of suitable thickness. The housing is divided into two compartments 11a and 11b by a plate 11. Compartment 11a contains the motor elements and compartment 11b houses a mechanical arrangement for controlling the motor output. Compartment 11a has suitable material around the inside thereof to shield against radiation from the radioactive source. Since only alpha and beta particles are used, this shielding may be relatively thin.

A shaft 12 is mounted for rotation within bearings 14 at each end of compartment 11a. Mounted on the shaft 12 are two permanent magnets 16 and 18, which are preferably circular in shape, and which form the rotor for the motor. The magnets are magnetized north (N) to south (S), as shown, thereby creating a cylindrical magnetic field in the space between the two magnets, with the direction of the lines of force in this field being represented by the arrowheads on line 20. A respective spacer 22 is mounted between the magnet 16 and the outer wall of the housing 10, and between the magnet 18 and the inner wall of the divider 11, to keep the shaft from moving axially.

Mounted on the shaft 12 is a source of radioactive material 24, for example a radioisotope, which emits charged particles 26. These particles bear a charge depending upon the type of radioactive material used as the source and they therefore may be either negatively charged beta particles or positive charged alpha particles. Many suitable materials for emitting predominantly only one type of particle are known in the art. For purposes of description, negative charged beta particles are considered but it should be recognized that positive alpha particles may be used just as well. The radioactive source may be mounted on the shaft in any desired fashion, for example by impregnating a piece of metal with the radioactive material and then fastening it to the shaft; impregnating or coating the shaft with the radioactive material; forming the shaft with hollow pockets or attaching suitable holders to accommodate a gaseous or liquid radioactive source (and suitably sealing and/or evacuating the motor housing in this case); or by any other suitable means. In FIGURE 2, the source 24 is a slug interposed between two parts of the shaft which are held together by a sleeve 25 either on the outside or flush with the periphery of the shaft. The sleeve 25 is of a material which permits the charged particles to pass therethrough.

In any arrangement for mounting the source 24, however, it is desirable that the source be placed completely around the circumference of the shaft 12 so that the particles may be emitted in all directions radial to the shaft, thereby providing greater interaction between the particles 26 and the lines of force 20. Also, it is preferred that the radioactive source be spread out in the space between the two magnets 16 and 18 rather than be concentrated over only a small portion of the shaft. This also serves to increase the interaction between the radioactive particles and the lines of force.

In operation, the charged particles 26 are emitted in all directions from the radioactive source. Those which move radially from the source and cross the magnetic field 20 in a direction transverse thereto, result in the production of a force on the particles, and an opposite force on the rotor. This creates a torque on the shaft 12 and causes it to rotate, as in conventional electric motors. Those particles which do not cross the field transversely still contribute to the shaft output torque. The amount of this contribution is dependent upon the angle of crossing. With the magnetic field as shown in FIG. 2, if the particles from the source are positive alpha particles, the shaft rotates in the counterclockwise direction, as shown in FIGURE 3. Negative beta particles produce shaft rotation in the opposite direction.

Since the range of the charged particles is generally limited to a few centimeters, or a few inches, the diameter of the rotor 16–18 and therefore of the magnetic field is relatively small. It should be realized, however, that the axial length of the shaft 12 can be made as large as desired, within the limits of practicability. When this is done, more permanent magnets can be installed along the shaft to serve as rotors and additional radioactive sources placed between these magnets in a manner which aids the over-all torque output of the motor.

After passing through the magnetic field, the charged particles are deflected in a direction approaching tangency to the cylindrical magnetic field. Therefore they are preferably removed from the system in order to prevent them from spiraling back into the magnetic field and cancelling the torque. This may be accomplished by the use of impingement targets 28 which are mounted around the inner periphery of the motor housing and suitably insulated therefrom by any suitable type of electrical insulating material, which is not shown in the drawings to avoid undue and unnecessary complication thereof. As can be seen in FIGURE 3, the impingement targets 28 are mounted at an angle with respect to the housing in order to be able to collect these particles. The impingement targets 28 are preferably electrostatically charged with a charge of the same polarity as that of the radioactive particles emitted by the source in order to cushion the impingement of these particles, thus reducing the backscatter of these particles and also reducing the generation of gamma rays or X-rays (the so-called "brehmsstrahlung"). As should be clear, the insulated targets 28 are electrostatically charged by a gradual accumulation of emitted impinging charged particles.

In order to obtain maximum torque, it is desirable that the emitted radioactive particles cross the magnetic field lines at right angles. Since the radioactive source emits particles at random in all directions, some of these particles will contribute little or no interaction with the magnetic field to produce the torque. Therefore, it is desirable to minimize this loss of torque by orienting as many of the particles as possible into entirely radial paths from the shaft. This can be done, for example, by moving the magnets 16 and 18 closer together with respect to the radioactive source. Also electrostatically charged deflectors 30 may be mounted on the shaft on each side of the radioactive source, as shown in FIGURE 4. The deflectors 30 are suitably insulated by electrical insulating material (not shown since it would unduly complicate the drawing) from the rest of the system and are charged at the same polarity as the charged particles 26, thereby tending to repel the charged particles and causing the particles having non-radial paths to vector into a more radial direction. It should be recognized, of course, that those particles which are emitted in an axial or near-axial direction to the shaft will impinge directly onto the deflectors 30. This is a beneficial result since, if the deflectors cannot be electrostatically charged from an outside source of electrical energy, these impinging particles charge the deflectors with the desired polarity charge. It should be recognized that it is quite feasible to convert charged particle radiation into electrical energy by a direct charging of electrodes. Such techniques, in fact, usually produce very high voltages at very small current and power ratings. For example, to give some indication of the magnitude of charge that can be produced, ¼ curie (about 0.0017 gram) of strontium 90 will produce a charge of about 365,000 volts with a power drain of only 0.0002 watt. Therefore, the deflectors 30 can be charged by the waste radiation of the cross-sectional ends of the radioactive source. In addition, those non-radially moving particles which impinge on the deflectors 30 serve to reinforce the electrostatic fields. It should be realized that the motor will still operate even without the deflectors 30. It should be recognized that the function of deflectors 30 can generally be performed by the accumulation of electrical charge on the inner surfaces of magnets 16 and 18 themselves. This is particularly useful in the case of non-conducting magnets, such as ones made of barium titanate material, for the charge will consequently become distributed in the most effective deflecting pattern conceivable.

It will be recognized that some form of return paths for the magnetic flux lines is desirable.

Strips 29 of a ferro-magnetic material, such as metal, in FIGURES 2, 3 and 4 function as such it is realized that these metal strips cross the paths of motion of the emitted particles, but by a suitable design of minimum cross-sectional area, this effect can be minimized. Alternatively the body of the housing can serve the flux return function if desired, although a certain degree of magnetic breaking effect may thus be introduced. In addition, the shaft can be so designed as to function as a flux return path such functioning should not interfere with the mounting of the radioactive source. In a preferred design illustrated in a later figure, it will be seen that a closed magnetic path may be provided without metallic flux return elements and without sacrificing any rotor performance.

Since the shaft 12 is always rotating, it is necessary to provide some arrangement for controlling the usable output of the motor. FIGURE 2 shows a mechanical arrangement for accomplishing this by connecting and disconnecting an auxiliary output shaft 34 to the constantly rotating shaft 12. In FIGURE 2, one half of a friction clutch 36 is connected to the end of the rotating shaft 12. The other half of the clutch 38 is formed with a collar 40, and the whole assembly is mounted on the end of the auxiliary shaft 34 by a set-screw 39. The collar 40 has a rear shoulder and the ends of a forked lever-arm 43 (only one lever arm being shown) surround the collar. The lever 42 for actuating the arms 43 is pivoted on a boss 45 mounted on the side wall of compartment 11b. The clutch half 38 is urged into engagement with clutch half 36 by a spring 41 which presses against the collar. When the clutch is engaged, shaft 34 rotates in the bearings 35 and the collar 40 freely rotates in the cradle formed by the lever arms 43. When the lever 42 is depressed, the ends of the arms 43 engage the collar rear shoulder and move the whole shaft axially, thereby disengaging the clutch and stopping the rotation of shaft 34.

Rather than control the motor output shaft by a mechanical device, the rotation of the motor and its speed can be controlled by varying the number of radioactive particles from the source 24 which are allowed to interact with the magnetic field. An arrangement suitable for this is shown in FIGURE 5, in which those elements of the motor having the same function as the elements of the motor shown in FIGURE 2 are designated by the same reference numbers. In this embodiment, a portion of the shaft 12a is made hollow to accommodate a plunger 53 which has a pin 51 connected to the end thereof to move a cylindrical shield 52 along the axis of shaft 12a to cover and uncover the radioactive source 24. The shaft 12a is slotted along its length to accommodate the movement of the pin 51. In this embodiment, the magnet 16 is mounted on a collar 54, one end of which is fixed to the shaft, so that the shield 52 may move therein. It should be realized that as the shield 52 is moved to cover more of the radioactive source 24, fewer particles are allowed to enter the magnetic field, thereby reducing the rate of interaction and consequently lowering the speed of the motor. By completely covering the source with the shield, all of the emitted particles will be absorbed and there will be no motor action. An alternative means of regulating the interaction of the emitted charged particles with the magnetic field, and thereby of controlling the motor's output torque, would be to control the density of the atmosphere inside the motor, and thus control the average distance that the particles travel. The speed of a motor that used an alpha-particle source thus could be controlled merely by regulating through a simple orifice control, for example, the outflow of helium that was generated from the particles since, normally, a means for venting the helium gas produced by the accumulated alpha particles (helium nuclei) would be necessary in any case; in the case of a beta-particle source, an external pressure source would be required. The former arrangement is shown by a variable pressure outflow check valve 100 in FIG. 5.

FIGURE 7 shows another embodiment of the invention in which use is made of the kinetic energy remaining in the particles which exit from the magnetic field outside of the rotor structure of the motors shown in FIGURES 2 and 5. In FIGURE 7, a structure similar to that shown in FIGURE 2 is provided, in that there is a radioactive source 24 mounted on the shaft 12, which also has mounted thereon a rotor structure formed by the permanent magnets 16 and 18. Outside of and coaxial with this first rotor is a second rotor structure which is formed by a frame 54 which holds a plurality of electrostatically charged vanes 50. The frame 54 holding the vanes has a second shaft 58 which is coaxial with shaft 12 and rotates in a direction opposite to shaft 12 in a second set of bearings 56 which are located between the side wall of the housing 10 and the inner shaft 12.

Figure 8:
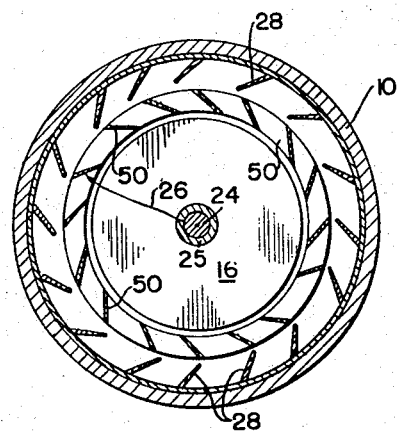
FIGURE 8 is a cross-section of the motor of FIGURE 7 taken along lines 8—8 of FIG. 7.

FIGURE 8 shows the path of travel of a single charge particle 26 as it leaves the source 24. Once the particle 26 passes outside of the magnetic field between the magnets 16 and 18, it tends to escape tangentially. At this point, the particle still has some kinetic energy left and it impinges upon one of the electrostatically charged vanes 50. These vanes bear a charge which is of the same polarity as the charge of the particular particle and they are gradually charged by the impinging emitted particles. As the particles 26 impinge upon the vanes 50, their kinetic energy is imparted to these vanes and causes the frame 54 and shaft 58 to rotate in a direction counter to that of the shaft 12. As before, the shaft 12 rotates due to the interaction of the charged particles in the magnetic field.

As in the case of the embodiments of the motor shown in FIGURES 2 and 5, impingement targets 28 are provided around the inner periphery of the housing to collect the radioactive particles in order to prevent any torque-cancelling effects.

The speed and operation of the motor shown in FIGURES 7 and 8 may be controlled by a friction-clutch mechanism, similar to that shown in FIGURE 2, in which case both shafts may either be controlled together by a single clutch, or by a clutch mechanism on each shaft. Also, the rotation of the shafts may be controlled by a movable shield similar to the one shown in FIGURE 5, in which case both shafts are controlled simultaneously.

It should also be recognized that other rotors may be mounted coaxially so that three or more rotors may be utilized in a manner similar to that shown in FIGURE 7. Of course, the use of the additional rotors is limited by the range of the radioactive particles. It should also be realized that instead of using the vanes 50 to produce the counter-rotating torque, that another magnetic field may be set up by using additional magnetic rotors.

In each of the embodiments of the invention heretofore described, the radioactive source is centrally located on the shaft itself. It should be realized, however, that effective utilization of particle radiation is largely a function of the exposed surface area of the material which emits the particles. In general, the charged particles will not penetrate any great thickness of material, and if the radioactive source is too large (thick), much of the radiation is absorbed in the source itself where it is lost, appearing as undesirable heat. Therefore, in order to maximize the torque output of the motor it is desirable to increase the surface area of the source for emitting particles into the magnetic field.

Figure 9:
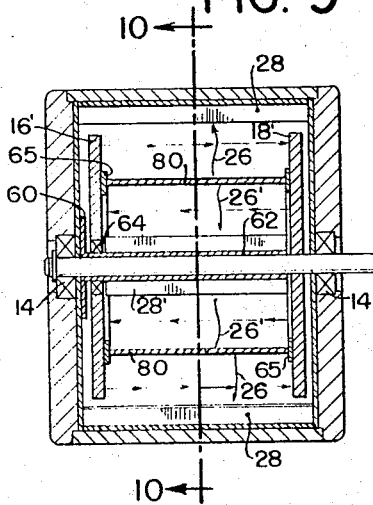
FIGURE 9 is a cross-section of still another embodiment of the motor built according to the principles of the present invention.
Figure 10:
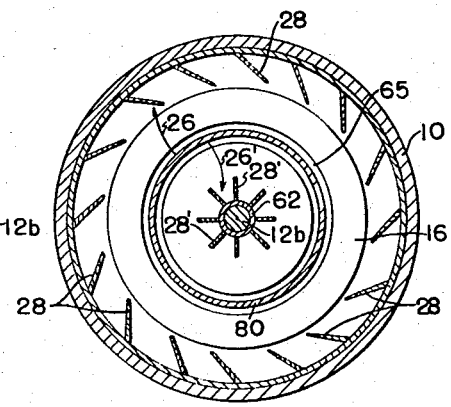
FIGURE 10 is a cross-section taken along lines 10—10 of the motor of FIG. 9.

FIGURES 9 and 10 show an embodiment of the invention in which maximum use is made of the radioactive particles while at the same time simplifying the assembly of the rotor structure and making it more stable. In FIGURE 9, the shaft 12b is left free to rotate within a set of bearings 14 at each end of the motor housing. Mounted on the shaft 12b is one of the permanent magnets 18. A collar 60 is fastened to the inner side wall of the housing, and this collar terminates in a stationary shaft 62 within which the shaft 12b is placed in a manner such that it is free to rotate. The other permanent magnet 16 of the rotor mounted on bearings 64 for rotation around the shaft 62. The shaft 62 extends substantially the length of the space between the magnets 16 and 18 but does not contact the magnet 18. Mounted on the shaft 62 between the two magnets are a plurality of impingement targets 28'. A plurality of impingement targets 28 are also mounted around the inside of the housing. These targets serve the same purpose as previously described.

In this embodiment, the radioactive source 80 is made from thin metallic sheets shaped in the form of a cylinder which extends between and is fastened to the inner walls of the magnets 16' and 18' by the circular channels 65 on each of the inner magnet walls. If desired, additional metallic or non-metallic members may be connected between the magnets for the purpose of strengthening the arrangement. The magnets 16' and 18' are magnetized in a manner such that the magnetic lines of force in the area enclosed by the cylindrical source 80 are in an opposite direction to those lines of force which lie outside of the cylinder. This is shown in FIGURE 9, where it can be seen that the magnetic lines within the cylinder formed by source 80 extend from right to left while those outside of the cylinder extend from left to right. In this way the problem of the return flux path in the magnetic circuit is also solved.

As particles are emitted from the source 80 they are emitted in the space both inside and outside of the cylinder. The directions of the particles within and without the cylinder are generally opposite to each other, as shown by the particles 26 and 26' in FIGURE 10. Since the lines of force inside and outside of the cylinder are also opposite, the torque produced on the rotor by the particles cross the oppositely-directed lines of force is aiding. When the torque is produced, magnet 16' rotates around the outer shaft 62 along with magnet 18', and targets 28' are stationary. The impingement targets 28 and 28' are suitably charged and collect the particles after they have passed through their respective magnetic fields.

It should be recognized that the cylindrically mounted source design shown in FIGURES 9 and 10 produces optimum utilization of the available particle energy. It should also be recognized that though the cylindrically mounted source 80 design shown in FIGURES 9 and 10, as well as the centrally mounted source 24 designs shown in FIGURES 2, 3, 4, 5, 7 and 8, illustrate the acceptability of permitting the radioactive source to rotate coincident with rotation of a rotor, this should not be interpreted as signifying that said rotation of the source is at all essential to operation of the motor. It is in fact conceivable that maximum efficiency of operation would require the source to be non-rotating, but the relative difference in performance is regarded to be too small to warrant depiction of a stationary-source motor in a separate figure. It should also be recognized that the outer shaft 62 can be designed to rotate in the opposite direction to the shaft 12b upon impingement of the particles by the impingement targets 28'. This arrangement is similar to that previously shown in FIGURES 7 and 8. Further, the outer impingement targets 28 may be mounted on a movable frame to produce counter-rotating shaft movement of the outer shaft 62 in a manner similar to that shown in FIGURES 7 and 8.

As in other embodiments of the invention previously described, electrostatic deflection of the particles to more radial paths by the use of the electrostatic deflectors can be utilized if desired. Also, the rotation of the shaft 12b of FIGURE 9 may be controlled by a clutch or other suitable type of arrangement for engaging and disengaging the constantly rotating shaft. If desired, the shielding arrangement shown in FIGURE 5 may also be utilized to control the rotation of the motor.

It has been derived that the approximate theoretical or ideal performance of the motors of the present invention may be calculated from the following equation:

$$T = \frac{\pi}{4} n M v^2$$

where T is the torque in dyne-centimeters per gram-second of source, $n$ is the number of particle emissions per second, M is the individual particle mass, and $v$ is the particle velocity in centimeters per second.

A chart showing approximate ideal power output produced for single rotor motors using different radioisotopes is given below:

| Isotope | Radiation | Half-Life | Approximate Ideal Power Output, Hp. per gram of Isotope |
|---|---|---|---|
| Plutonium 239, $Pu^{239}$ | α | 24,400 yrs | $3 \times 10^{-6}$ |
| Plutonium 238, $Pu^{238}$ | α | 90 yrs | $9 \times 10^{-5}$ |
| Strontium 90, $Sr^{90}$ | β | 25 yrs | $4 \times 10^{-4}$ |
| Rubidium 86, $Ru^{86}$ | β | 19 days | 0.2375 |
| Carbon 14, $C^{14}$ | β | 5,600 yrs | $8 \times 10^{-6}$ |
| Promethium 147, $Pm^{147}$ | β | 4.4 yrs | $8 \times 10^{-4}$ |
| Phosphorus 32, $P^{32}$ | β | 14 days | 0.3 |

Where any radioactive isotopes also produces gamma radiation, suitable shielding must be provided, as is well known. The isotope selected as can be seen, depends upon the motor output desired at the time for which the motor is to run, the latter factor being determined by the half-life of the isotope. It should also be recognized that additional output may be obtained by using additional rotor structures on the same (or counter-rotating) shaft and by using additional radioactive sources.

While several embodiments of the invention have been described to illustrate the basic concept of the motor, many suitable variations may be made. For example, the magnets which form the rotors may be suitably designed in other than the circular form illustrated. Further, the motor housing may be evacuated in order to reduce collisions between the particles and the air within the housing. Also, radioactive sources may be located in various positions within the motor housing, for example, around the inner periphery of the housing wall or at selected points thereof. In this case, the radiation would be in towards the shaft. If desired, charged deflectors may be placed adjacent the source or sources to focus the particles into the magnetic field.

While preferred embodiments have been described above it will be understood that many variations thereof will be readily apparent to those skilled in the art without departing from the spirit thereof. Therefore, it is intended that the foregoing description shall be deemed illustrative only and not construed in a limiting sense, the present invention being defined solely by the appended claims.

We claim:

1. In a motor powered by a source of high velocity charged particles the combination comprising a rotatable shaft, a source for emitting charged particles, whose charges are predominantly of one polarity, means for producing a magnetic field for interaction with said emitted charged particles, and means for fixedly mounting at least a part of said magnetic field producing means for rotation with said shaft, the interaction of said charged particles and said field producing a force on said particles and a torque on said shaft to rotate the same.

2. A motor as set forth in claim 1 wherein means are provided for mounting said source within said magnetic field whereby the particles emitted in all directions interact with said magnetic field.

3. A motor as set forth in claim 1 wherein means are provided for controllably shielding the source to control the number of charged particles interacting with said magnetic field thereby to control the rotation of said shaft.

4. In a motor operated by electrically charged particles the combination comprising a shaft, means mounting said shaft for rotation, a source for emitting charged particles whose charges are predominantly of one polarity, means for producing a magnetic field for interaction with said emitted charged particles, means for fixedly mounting at least a part of said magnetic field producing means for rotation with said shaft, the interaction of said charged particles and said field producing a force on said particles and a torque on said shaft to rotate the same, and deflector means mounted adjacent said source for directing emitted particles in a path which is substantially transverse to the direction of the magnetic field.

5. In a motor operated by electrically charged particles the combination comprising a shaft, means for mounting said shaft for rotation, a source for emitting charged particles, whose charges are predominantly of one polarity, means for producing a magnetic field for interaction with said emitted charged particles, means for mounting at least a portion of said magnetic field producing means for rotation with said shaft, the interaction of said charged particles and said field producing a force on said particles and a torque on said shaft to rotate the same, and means mounted adjacent said magnetic field producing means for collecting said charged particles after passing through said magnetic field to prevent said particles from re-entering the magnetic field and cancelling the torque.

6. In a motor operated by electrically charged particles the combination comprising a rotatable shaft, means for mounting said shaft for rotation, a source for emitting charged particles whose charges are predominantly of one polarity, means for producing a magnetic field for interaction with said emitted charged particles, means for mounting at least a portion of said magnetic field producing means for rotation with said shaft, the interaction of said charged particles and said magnetic field producing a force on said particles and a torque on said shaft to rotate the same, means mounted adjacent said source for directing said emitted particles in a path which is substantially transverse to the direction of the magnetic field, and means mounted adjacent said magnetic field producing means for collecting said charged particles after passing through said magnetic field to prevent said particles from re-entering the magnetic field and cancelling the torque.

7. In a motor operated by electrically charged particles the combination comprising a shaft, means for mounting said shaft for rotation, a radioactive source for emitting charged particles having charges of predominantly one polarity, means for mounting said source on said shaft, and magnetic rotor means for producing a magnetic field for interaction with said emitted charged particles, means for mounting said rotor means on said shaft for rotation therewith, the interaction of said charged particles and said field producing a force on said particles and a torque on said shaft which produces rotation thereof.

8. A motor as set forth in claim 7 wherein shield means are provided coaxial with the shaft for controllably covering the source to vary the number of charged particles interacting with said magnetic field thereby to control the rotation of the shaft.

9. A motor as set forth in claim 7, in which said magnetic rotor is formed by two permanent magnets mounted on said shaft with the radioactive source located therebetween.

10. A motor as set forth in claim 9, in which said source is of radioactive material and is located on said shaft.

11. In a motor operated by electrically charged particles the combination comprising a first shaft, means for mounting said shaft for rotation, a radioactive source for emitting charged particles having charges of predominantly one polarity, magnetic rotor means mounted on and rotatable with said first shaft for producing a magnetic field for interaction with said emitted charged particles, the interaction of said charged particles and said field producing a force on said particles and a torque on said first shaft which produces rotation thereof, a second rotatable shaft, means for mounting said second shaft for rotation and coaxial with said first shaft, charged vanes connected to said second shaft, the charged particles leaving said magnetic field impinging upon said charged vanes to impart kinetic energy thereto to produce rotation of said second shaft.

12. In a motor operated by electrically charged particles the combination comprising a housing containing therein: a shaft, means for mounting said shaft for rotation, a radioactive source for emitting charged particles having charges of predominantly one polarity, means for producing a magnetic field for interaction with said emitted charged particles, means for mounting at least a portion of said magnetic field producing means for rotation with said shaft, the interaction of said charged particles and said field producing a force on said particles and a torque on said shaft to rotate the same, and gas-pressure control means for regulating the gas pressure in said housing to control the average distance of travel of particles interacting with said magnetic field thereby to control the rotation of said shaft.

13. In a motor operated by electrically charged particles the combination comprising a housing containing therein: a first shaft fixedly mounted to the housing, a second shaft, means for mounting said second shaft for rotation within said first shaft, and with respect to the housing, first and second magnetic field producing means extending generally transversely to said second shaft, means for mounting said first field producing means for rotation about said first shaft, means for fixedly mounting said second field producing means on said second shaft for rotation therewith and spaced a distance from said first field producing means to produce a magnetic field therebetween, a radioactive source for emitting charged particles for interaction with said magnetic fields, the particles having charges of predominantly one polarity, means for mounting said source between said first and second field producing means and generally parallel to and spaced from said second shaft whereby a magnetic field exists on both sides of said source facing and opposite said second shaft, the interaction between said particles and said magnetic field producing a force on said particles and a torque on said second shaft to produce rotation thereof.

14. The motor as set forth in claim 13, in which impingement targets are provided within the housing to collect the charged particles on both sides of said source after they have passed through said magnetic field.

15. A motor as set forth in claim 13, in which the first and second magnetic field producing means are magnetized to produce magnetic fields of opposite directions on opposite sides of the source respectively.

16. A motor as set forth in claim 13 wherein said source is generally cylindrical in shape and is held between said first and second field producing means generally coaxial with said second shaft.

References Cited by the Examiner
UNITED STATES PATENTS

| | | | |
|---|---|---|---|
| 1,999,407 | 4/1935 | Dumont | 310—3 |
| 2,548,225 | 4/1951 | Linder | 310—3 |
| 2,662,208 | 12/1953 | Wells. | |
| 2,824,246 | 2/1958 | Keller | 310—3 |
| 2,934,887 | 5/1960 | Keller | 310—3 X |
| 2,971,122 | 2/1961 | Sloan | 313—54 X |

CHESTER L. JUSTUS, Primary Examiner.

C. F. ROBERTS, G. M. FISHER, Assistant Examiners.